US010983006B2

(12) United States Patent
Stanley et al.

(10) Patent No.: US 10,983,006 B2
(45) Date of Patent: Apr. 20, 2021

(54) OPTICAL SYSTEM

(71) Applicant: CSEM CENTRE SUISSE D'ELECTRONIQUE ET DE MICROTECHNIQUE SA-RECHERCHE ET DÉVELOPPEMENT, Neuchâtel (CH)

(72) Inventors: Ross Stanley, Epalinges (CH); Amina Chebira, Lausanne (CH); Liza Andrea Dunbar, Saint-Blaise (CH)

(73) Assignee: CSEM CENTRE SUISSE D'ELECTRONIQUE ET DE MICROTECHNIQUE SA—RECHERCHE ET DÉVELOPPEMENT, Neuchâtel (CH)

( * ) Notice: Subject to any disclaimer, the term of this patent is extended or adjusted under 35 U.S.C. 154(b) by 0 days.

(21) Appl. No.: 16/471,899

(22) PCT Filed: Dec. 21, 2016

(86) PCT No.: PCT/EP2016/082055
§ 371 (c)(1),
(2) Date: Jun. 20, 2019

(87) PCT Pub. No.: WO2018/113939
PCT Pub. Date: Jun. 28, 2018

(65) Prior Publication Data
US 2020/0103277 A1  Apr. 2, 2020

(51) Int. Cl.
G01J 3/28 (2006.01)
G01J 3/02 (2006.01)

(52) U.S. Cl.
CPC ........... *G01J 3/2823* (2013.01); *G01J 3/0208* (2013.01); *G01J 3/0224* (2013.01); *G01J 3/2803* (2013.01); *G01J 2003/2826* (2013.01)

(58) Field of Classification Search
CPC ...... G01J 3/2823; G01J 3/0208; G01J 3/0224; G01J 3/02803; G01J 2003/2826
See application file for complete search history.

(56) References Cited

U.S. PATENT DOCUMENTS 6,133,986 A * 10/2000 Johnson ............. G02B 21/0028
355/43
6,798,390 B1 * 9/2004 Sudo .................... H04N 13/398
345/7

(Continued)

FOREIGN PATENT DOCUMENTS

| EP | 3 020 326 | 5/2016 |
| WO | 2013/048548 | 4/2013 |
| WO | 2013/064512 | 5/2013 |

OTHER PUBLICATIONS

International Search Report for PCT/EP2016/082055, dated Oct. 17, 2017, 7 pages.

(Continued)

*Primary Examiner* — Dominic J Bologna
(74) *Attorney, Agent, or Firm* — Nixon & Vanderhye P.C.

(57) ABSTRACT

The present invention relates to an optical system including at least one objective lens (2) for receiving light from an object (1), an array of image forming elements (4) for generating multiple images of the object on an image sensor plane (SP) and a filter (F). The optical system is configured to form a real image of the filter on the array of image forming elements to filter the multiple images of the object, the filter being arranged with respect to the at least one objective lens so that a real image of the filter is formed on the array of image forming elements, and wherein the optical system is configured to be telecentric in the image plane of the filter.

21 Claims, 14 Drawing Sheets

(56) References Cited

U.S. PATENT DOCUMENTS

| | | | |
|---|---|---|---|
| 7,932,993 B2* | 4/2011 | Mei ........................ | G03B 27/54 355/53 |
| 2014/0240514 A1* | 8/2014 | Love ...................... | H04N 5/332 348/164 |
| 2014/0375776 A1 | 12/2014 | Abolbashari et al. | |
| 2015/0219494 A1 | 8/2015 | Hruska et al. | |
| 2015/0288894 A1* | 10/2015 | Geelen .................. | G01J 3/0208 348/342 |
| 2016/0135682 A1* | 5/2016 | Bedard ................... | A61B 3/14 351/206 |
| 2016/0299064 A1* | 10/2016 | Shimura ............... | G01J 3/0224 |
| 2016/0349228 A1* | 12/2016 | Kester ...................... | G01J 3/36 |

OTHER PUBLICATIONS

Written Opinion of the ISA for PCT/EP2016/082055, dated Oct. 17, 2017, 6 pages.
"Telecentric Lens", Wikipedia, Feb. 23, 2016, XP002774317.

* cited by examiner

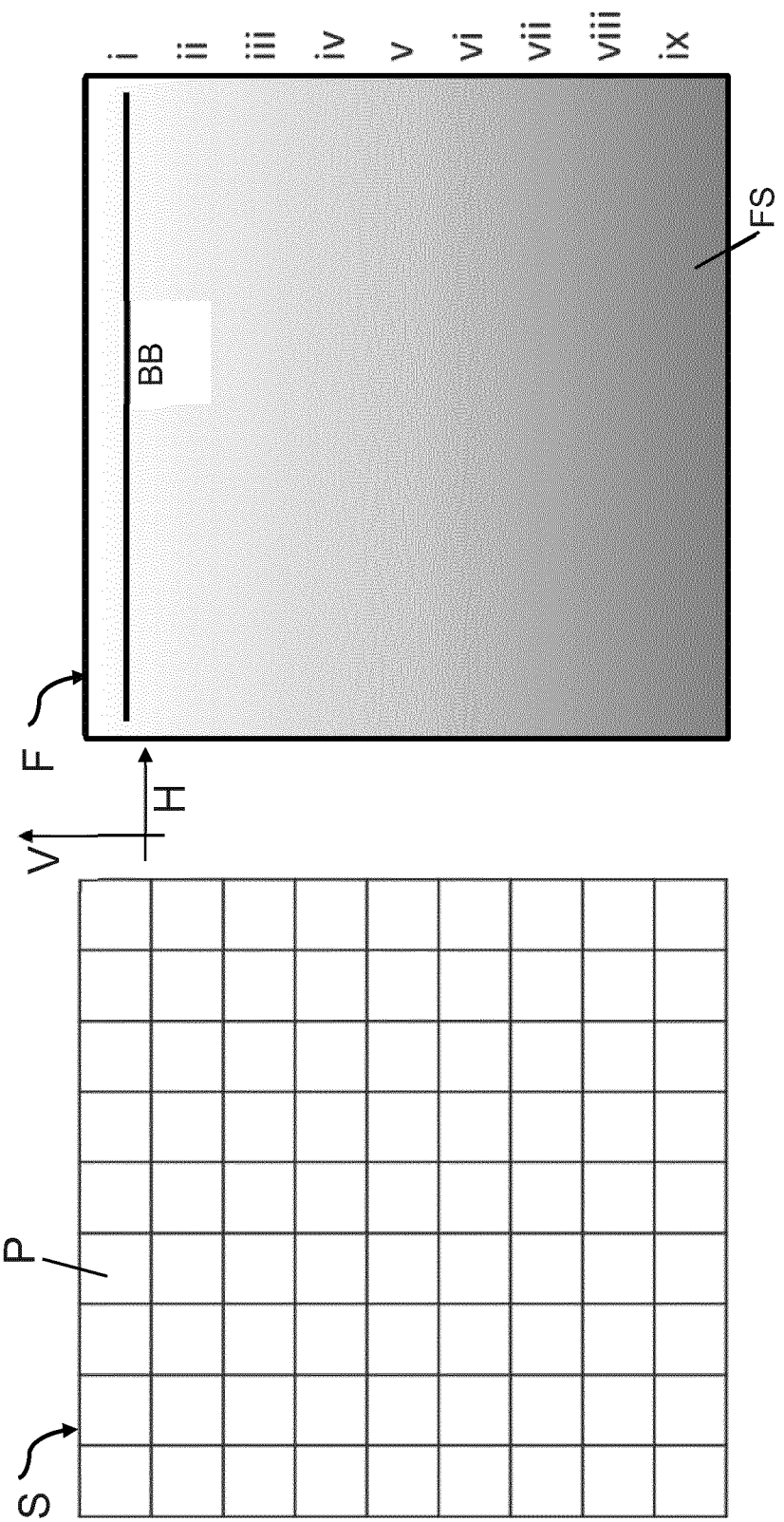

OPTICAL SYSTEM

This application is the U.S. national phase of International Application No. PCT/EP2016/082055 filed 21 Dec. 2016, which designated the U.S., the entire contents of which is hereby incorporated by reference.

FIELD OF THE INVENTION

This present invention concerns optical systems and in particular hyper or multi-spectral optical systems.

More particularly, the present invention concerns a snapshot hyper or multi-spectral optical systems for obtaining image data, for example, in the spatial or in the frequency (Fourier) domain at a plurality of different wavelengths via a configuration in which multiple images of an object are generated where each of the generated multiple images is filtered, for example, at a specific wavelength. Alternatively, or additionally intensity or polarization filtering can be carried out.

BACKGROUND

A snapshot hyper/multi-spectral camera takes an image at multiple wavelengths. There are many ways of organising the spatial and wavelength information on the detector or image sensor. One of the most common configurations is to group the spatial information together as multiple images on the detector where each image has a different wavelength.

However, such a system configuration is cumbersome and difficult to make compact.

SUMMARY

It is therefore one aspect of the present disclosure to provide an alternative optical system. It is therefore also a further aspect of the present disclosure to provide an optical system or a hyper or multi-spectral optical system that may allow the above mentioned inconvenience to be overcome.

The optical system preferably includes at least one objective lens for receiving light from an object, an array of image forming elements for generating multiple images of the object on an image sensor plane and a filter F. The optical system is configured to form a real image of the filter on the array of image forming elements to filter the multiple images of the object.

This optical system configuration comprising an array of image forming elements and a filter permitting to achieve wavelength and/or intensity, and/or polarization selection advantageously allows a more compact system to be provided.

Furthermore, forming a real image of the filter on the array of image forming elements to filter the multiple images of the object can advantageously allow the number of filters to be no greater than the amount of wavelengths to be filtered, and the size of the filters are not limited by the size of a detector of the system. Moreover, the range of angles impinging on the filter can be made smaller.

Moreover, in the case where a filter is placed on or near the array of imaging elements (for example, microlenses), individual filters (or filter sections or areas) of such a filter should preferably be the size of one of the images of the object produced by a microlens. Additionally, when such a filter is placed near the microlens array, the range of angles that the filter sees is the same as the numerical aperture (NA) of the camera, and for sensitive cameras the NA is generally large, leading to a wide range of angles on the filter. Standard narrow band filters are strongly angular-dependent so this limits the linewidth of the filter. Consequently, forming a real image of the filter on the array of image forming elements also advantageously permits these inconveniences to be overcome.

According to another aspect of the present disclosure, the filter is arranged with respect to the at least one objective lens so that a real image of the filter is formed on the array of image forming elements.

According to another aspect of the present disclosure, the optical system is configured to be telecentric in an image plane of the filter (F).

According to yet another aspect of the present disclosure, the optical system is further configured to be telecentric in an object plane of the filter to form a doubly telecentric system.

The telecentric optical system advantageously allows a fixed magnification image of the filter on the array of imaging elements.

According to still another aspect of the present disclosure, the filter is located at a position upstream from the objective lens or behind the objective lens or in contact with objective lens so that the filter is imaged by the objective onto the array of image forming elements.

According to another aspect of the present disclosure, the filter is a multiplexed filter.

According to another aspect of the present disclosure, the system is configured to limit the light rays forming the filter image on the array to telecentric light rays or to lights rays propagating substantially parallel to an optical axis of the optical system.

According to still another aspect of the present disclosure, the filter is mounted in the system to be rotatable and/or tiltable about an optical axis of the system.

According to yet another aspect of the present disclosure, the filter is a spectral filter, a polarization filter or an intensity filter, or a spectral and polarization filter, or a spectral and intensity filter, or a polarization and intensity filter, or a spectral, polarization filter and intensity filter.

According to another aspect of the present disclosure, the image forming elements of the array of image forming elements comprise lenses, micro-lenses or pinholes.

According to yet another aspect of the present disclosure, the array of image forming elements comprises a plurality of image forming elements extending in a vertical direction and a plurality of image forming elements extending in a horizontal direction, the horizontal direction being perpendicular to the vertical direction; and the filter defines an incident surface area, the filter being configured to continuously filter at different wavelengths across the incident surface area along a direction of the incident surface area following said horizontal direction.

According to another aspect of the present disclosure, the filter is further configured to continuously filter at different wavelengths along a direction of the incident surface area following said vertical direction.

According to yet another aspect of the present disclosure, the filter is further configured to continuously filter at different wavelengths along all directions across the incident surface area.

According to still another aspect of the present disclosure, an optical thickness of the filter varies across the entire filter along any direction, or across only a portion of the filter along any direction.

According to yet another aspect of the present disclosure, an optical thickness of the filter varies continuously in a linear or non-linear manner, and/or varies according to a step-profile.

According to another aspect of the present disclosure, the filter varies in thickness across all directions of the filter.

According to yet another aspect of the present disclosure, the filter has a constant optical thickness constant across the entire filter along only one direction, and wherein said filter is orientated about an optical axis of the system and with respect to the array of imaging elements such that the direction of constant optical thickness of the filter is orientated at an angle relative to the array.

According to another aspect of the present disclosure, the system further includes a beam-splitter (BS).

According to yet another aspect of the present disclosure, the system comprises the objective lens, a second lens, the filter and the array of image forming elements respectively arranged along an optical axis, wherein the filter is located at a position upstream from the objective lens or in contact with objective lens so that the filter is imaged by the objective and second lens onto the array of image forming elements, and the array generates the multiple images of an object on the image sensor plane.

According to still another aspect of the present disclosure, the system further includes a field stop located between the objective lens and the second lens.

According to yet another aspect of the present disclosure, the objective lens and the second lens are located with respect to each other such that a focal point of the objective lens is located at a focal point of the second lens.

According to another aspect of the present disclosure, the optical system is arranged or configured as a telescope system advantageously allowing parallax in image and object space to be removed.

According to yet another aspect of the present disclosure, the system further includes a beam-splitter, a third lens and a second sensor, wherein the beam-splitter is located before the filter, and the third lens is arranged to image unfiltered light onto the second image sensor;
or further includes a beam-splitter, a third lens and a second sensor, wherein the beam-splitter is located between the objective lens and the second lens, and the third lens is arranged to image filtered light onto the second image sensor;
or further includes a beam-splitter, a third lens and a second sensor, wherein the beam-splitter is located between the filter and the objective lens, and the third lens is arranged to image filtered light onto the second image sensor;
or further includes a beam-splitter, a third lens and a second sensor, wherein the beam-splitter is located between the objective lens and the array of image forming elements and the third lens is arranged to image filtered light onto the second image sensor.

According to still another aspect of the present disclosure, the array of image forming elements and/or the objective lens are mounted in the system to be mobile along the optical axis to allow the spatial resolution of the optical system to be increased.

According to another aspect of the present disclosure, the optical system is a hyper or multi-spectral optical system.

According to yet another aspect of the present disclosure, the filter is configured to simultaneously filter each of the multiple images of the object at a different wavelength.

It is yet another aspect of the present disclosure to provide a single or doubly telecentric optical system or apparatus including the above telecentric optical system that is then afocal and if the angular magnification is unity, then it can be dropped into or inserted into a doubly telecentric optical system to form a four-times telecentric system.

The optical system of the present disclosure advantageously allows smaller angles to be incident on the filter permitting an improved filtering function to be achieved. Additionally, the optical system of the present disclosure is less expensive to implement compared to attaching individual filtering tiles onto a sensor.

Moreover, the filter is not located on the sensor allowing a large number of possibilities for the locating the filter in the system as there is a flexible choice concerning the positioning of the filter in the system. Furthermore, the optical system of the present disclosure permits the filter to be easy changed or replaced thus providing an adaptive system. Finally, the optical system of the present disclosure requires only one filter and there is no absolute need to include multiple filters.

The above and other objects, features and advantages of the present invention and the manner of realizing them will become more apparent, and the invention itself will best be understood from a study of the following description with reference to the attached drawings showing some preferred embodiments of the invention.

A BRIEF DESCRIPTION OF THE SEVERAL VIEWS OF THE DRAWINGS

The above object, features and other advantages of the present invention will be best understood from the following detailed description in conjunction with the accompanying drawings, in which:

FIG. 1 schematically shows a configuration or arrangement where multiple series of images are generated and are each filtered;

FIG. 2 schematically shows an exemplary optical system according to an embodiment of the present invention;

FIGS. 3 to 4 schematically show an exemplary optical system according to another embodiment of the present invention;

FIG. 5A schematically illustrates an image sensor comprising a plurality of light sensing elements or pixels (or super-pixels) P extending in a vertical direction V and a plurality of light sensing elements or pixels P extending in a horizontal direction H, the horizontal direction H being perpendicular to the vertical direction V;

FIG. 5B schematically illustrates an exemplary optical filter including a filtering section according to the present invention;

FIG. 5C schematically illustrates an image sensor, identical to that of FIG. 5B, comprising a matrix of pixels, or alternatively an array of image forming elements such as microlenses;

FIG. 5D schematically illustrates an optical filter that is formed using a graded filter where i to ix represents positions on the filter having a different peak transmission wavelength;

Figure 3:
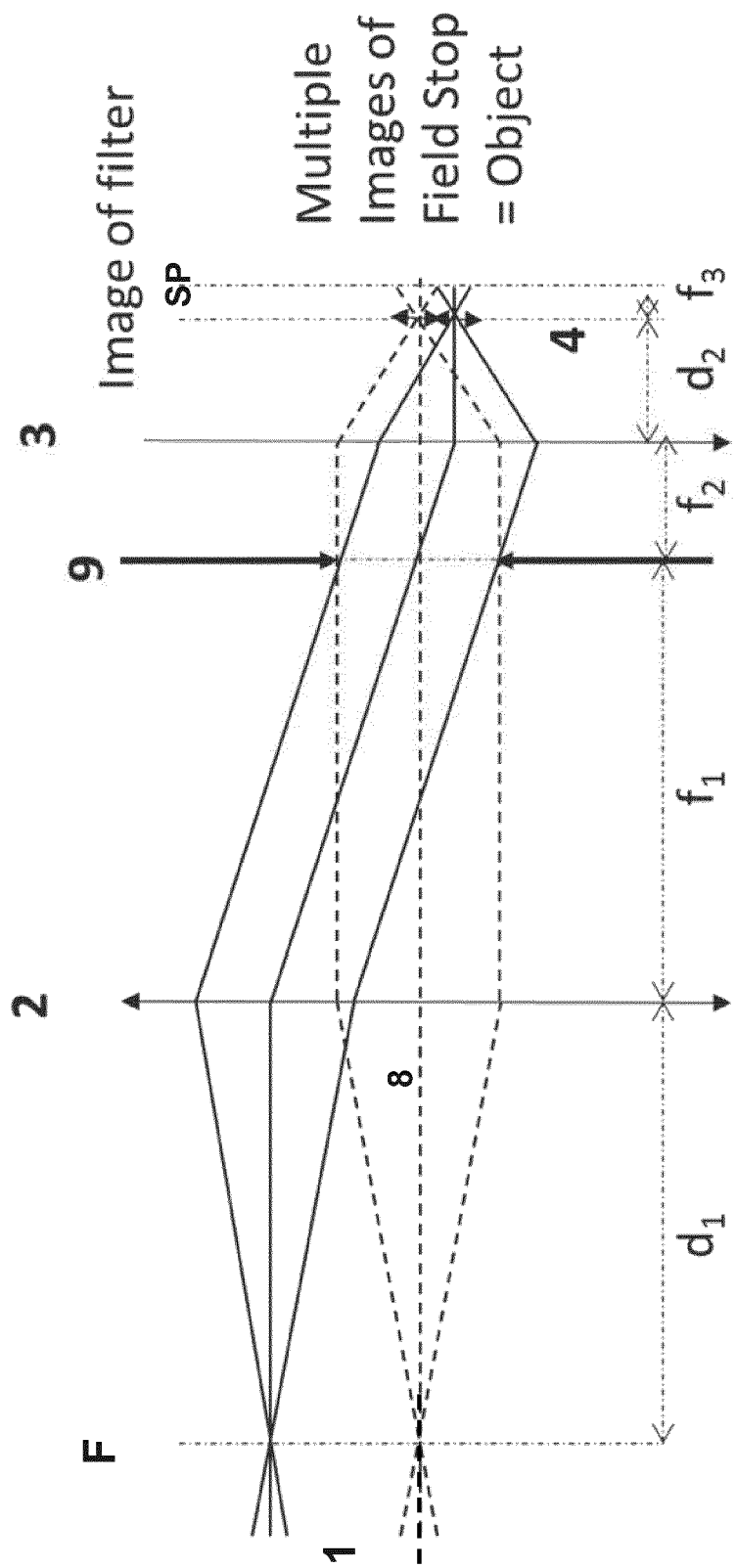
Figure 4:
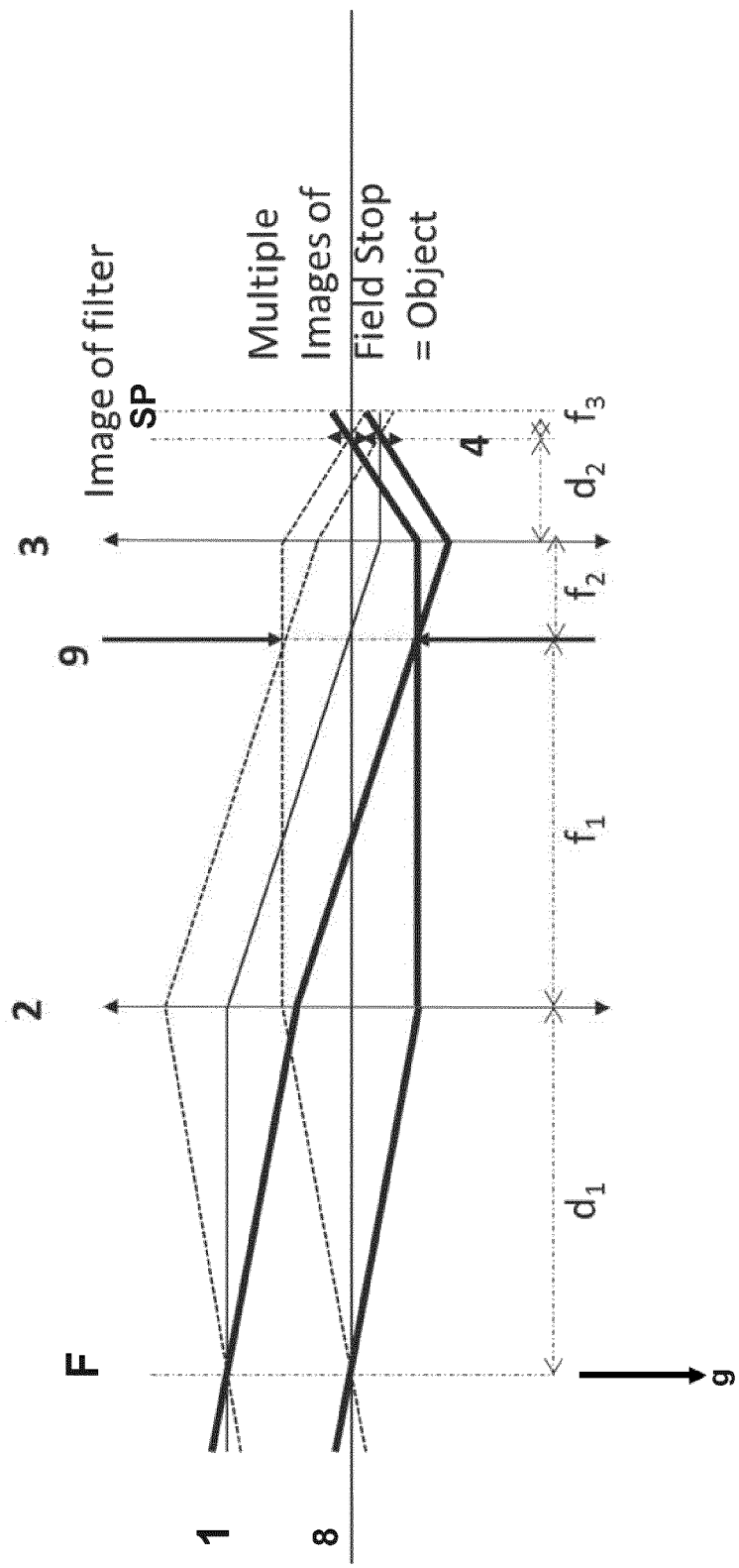
Figure 6:
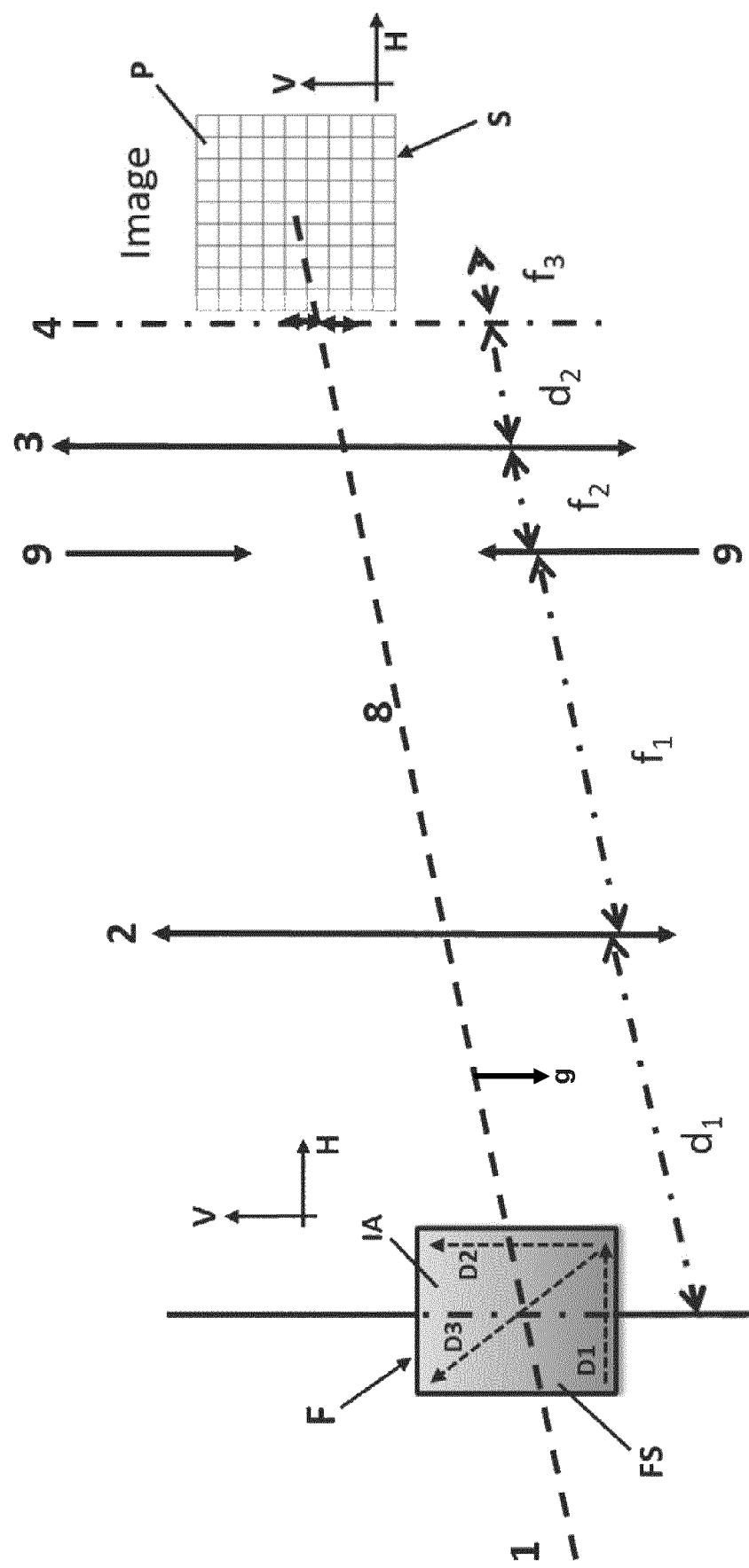
Figure 7:
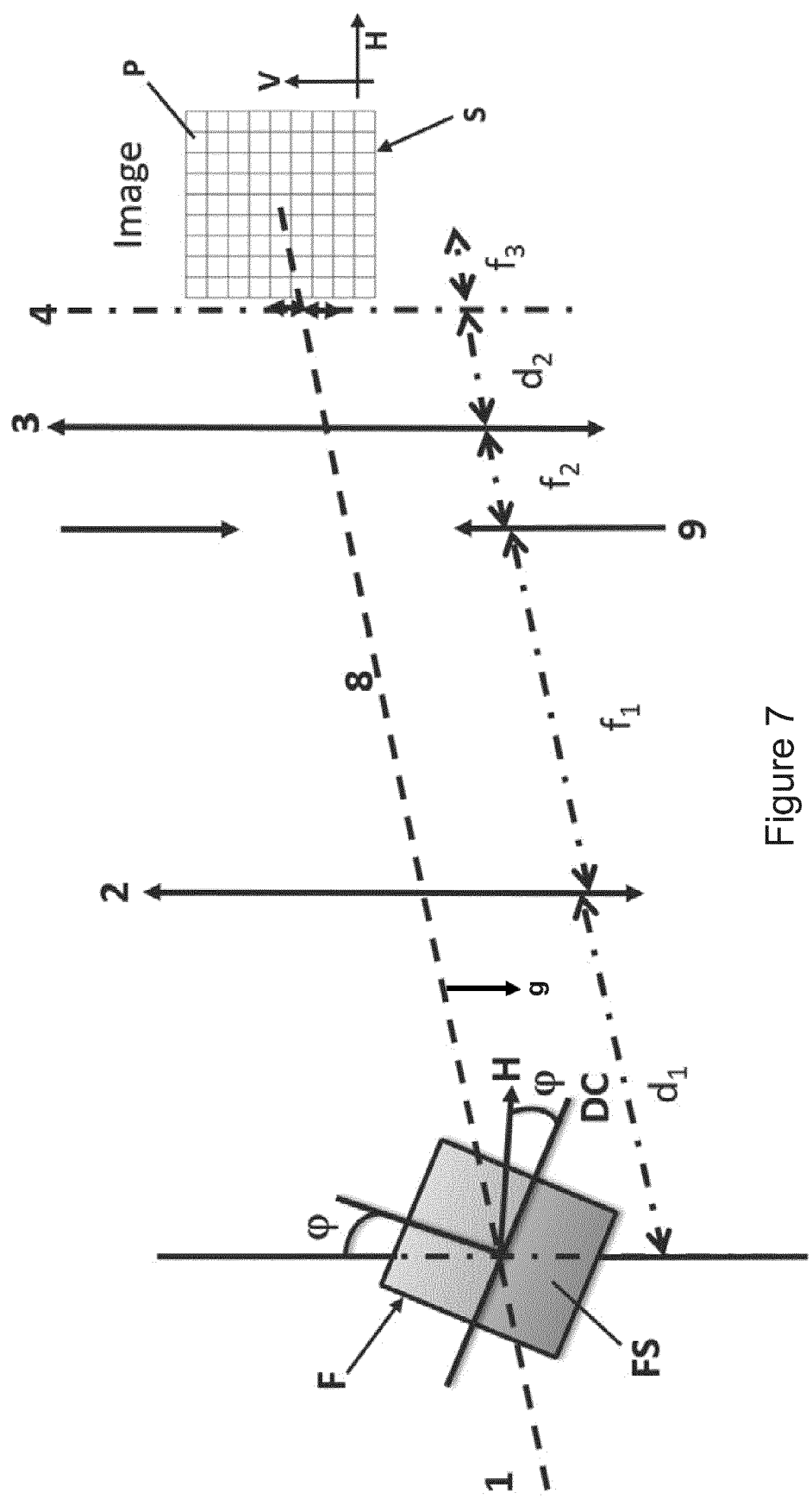
Figure 8:
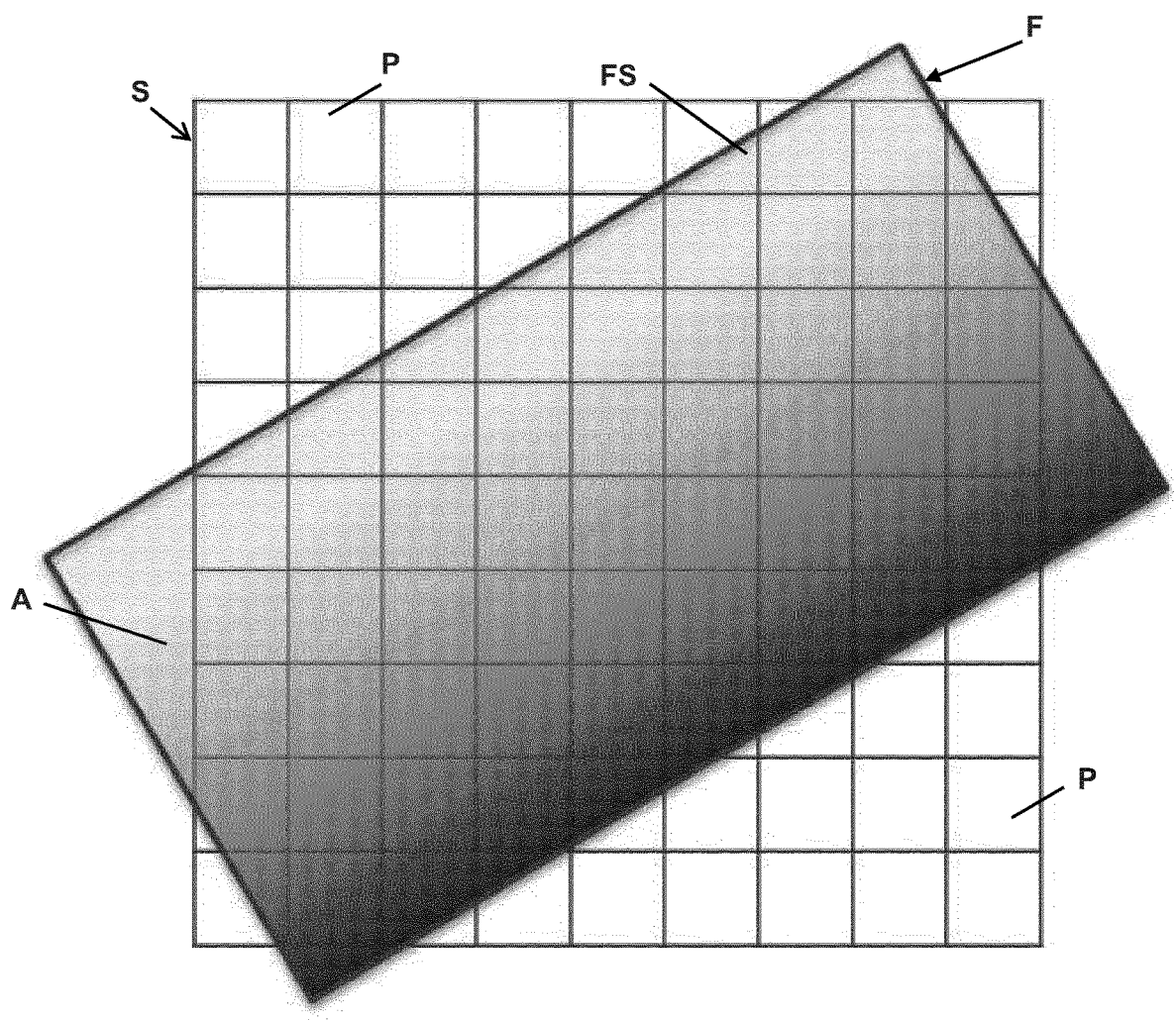
Figure 9:
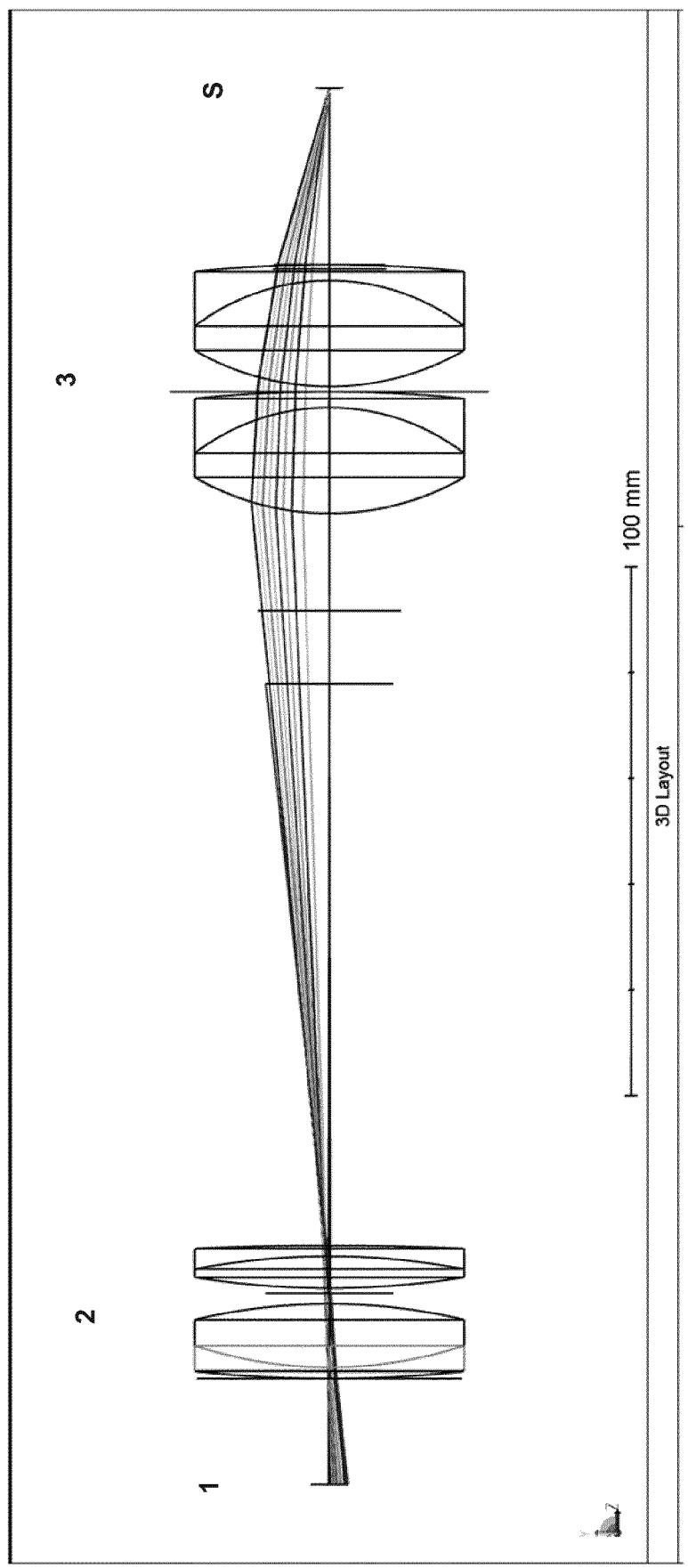
Figure 10:
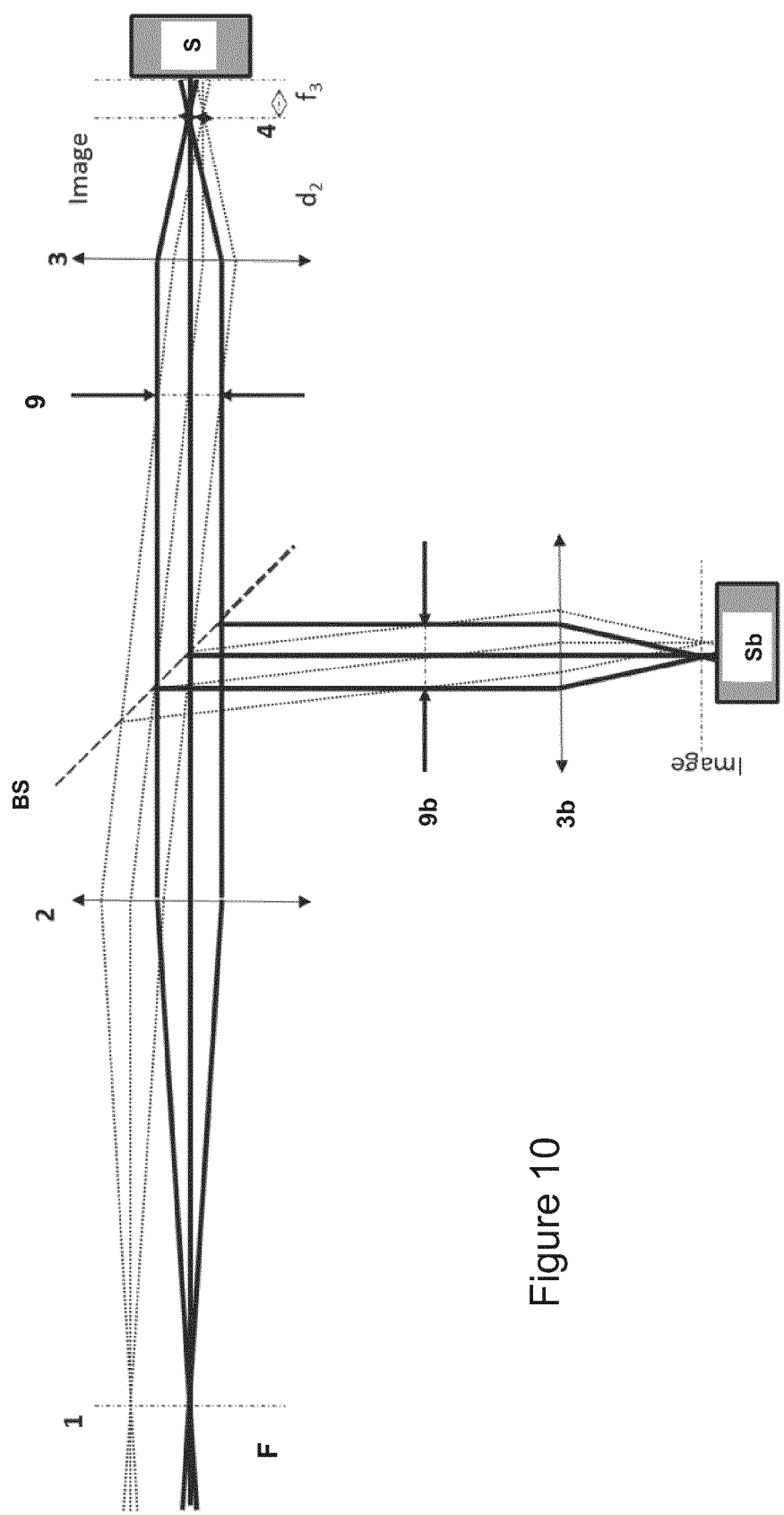
Figure 11:
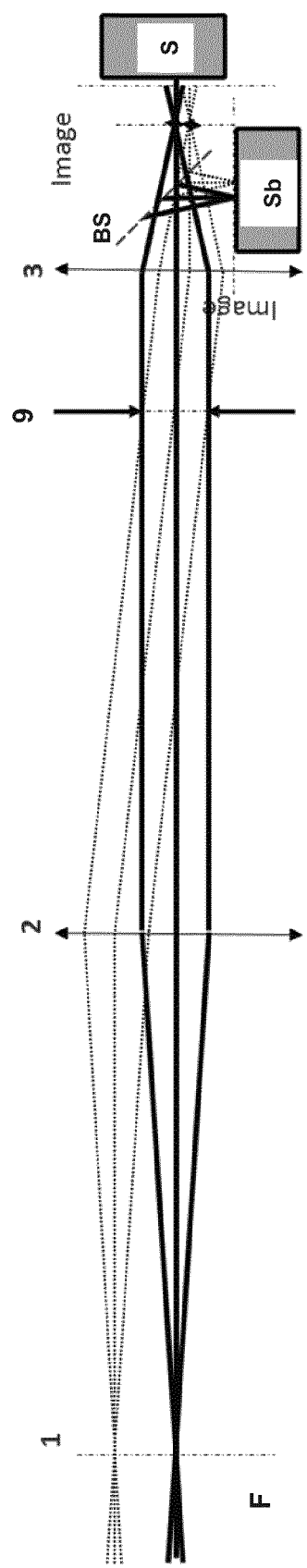
Figure 12:
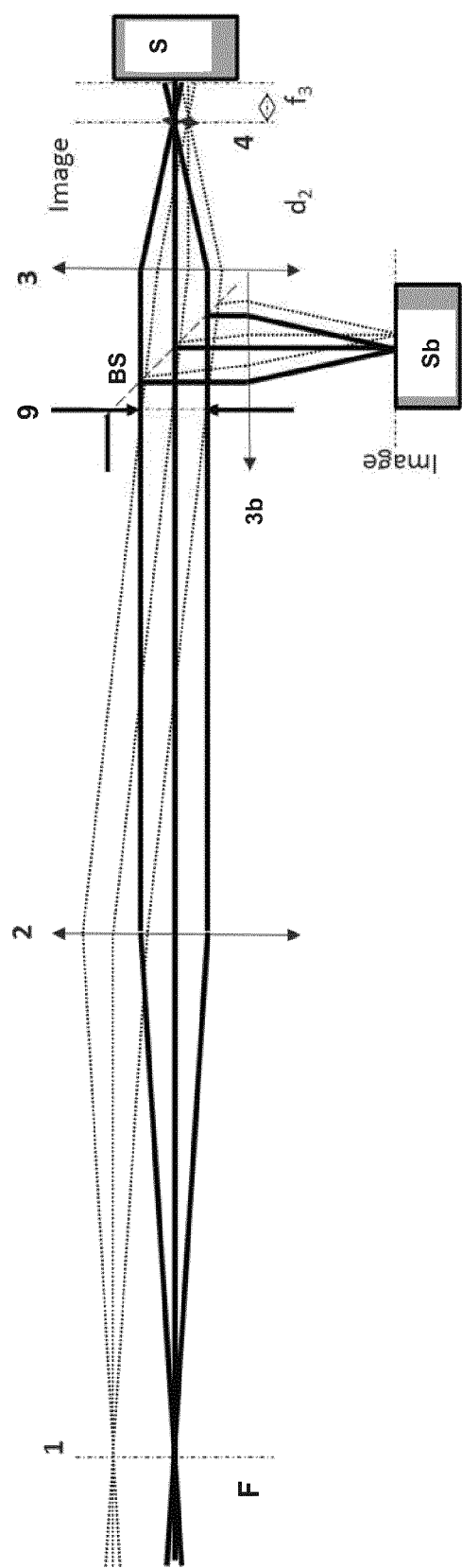

FIG. 6 schematically shows the same optical system of FIGS. 3 to 4 from a perspective view showing the optical axis through the system and including the optical filter of FIG. 8B;

FIG. 7 schematically shows the same optical system of FIGS. 3 to 4 from a perspective view and including the optical filter of FIG. 5D, the filter is rotated at angle φ relative to the optical axis and is rotated with respect to the horizontal axis of the image sensor and/or the array of imaging elements;

FIG. 8 schematically shows a linear graded filter aligned at 45° to one of the axis of the image sensor or or array of imaging elements that comprises an N×N array of elements;

FIG. 9 shows system modeling in Zemax™ using a pair of achromatic lenses to implement a telecentric design; and FIGS. 10 to 12 schematically show the inclusion of a beam-splitter in the optical system, for example, to increase spatial resolution.

Herein, identical reference numerals are used, where possible, to designate identical elements that are common to the figures.

DETAILED DESCRIPTION OF THE SEVERAL EMBODIMENTS

The optical system of the present invention includes an objective lens 2 for receiving light from an object 1, an array 4 of image forming elements for generating multiple images i1 of the object 1 on an image sensor plane SP and an image sensor S. The system also includes a filter F that can be for example a multiplexed filter (see FIG. 1) arranged to filter the multiple images i1 of the object 1.

Figure 1:
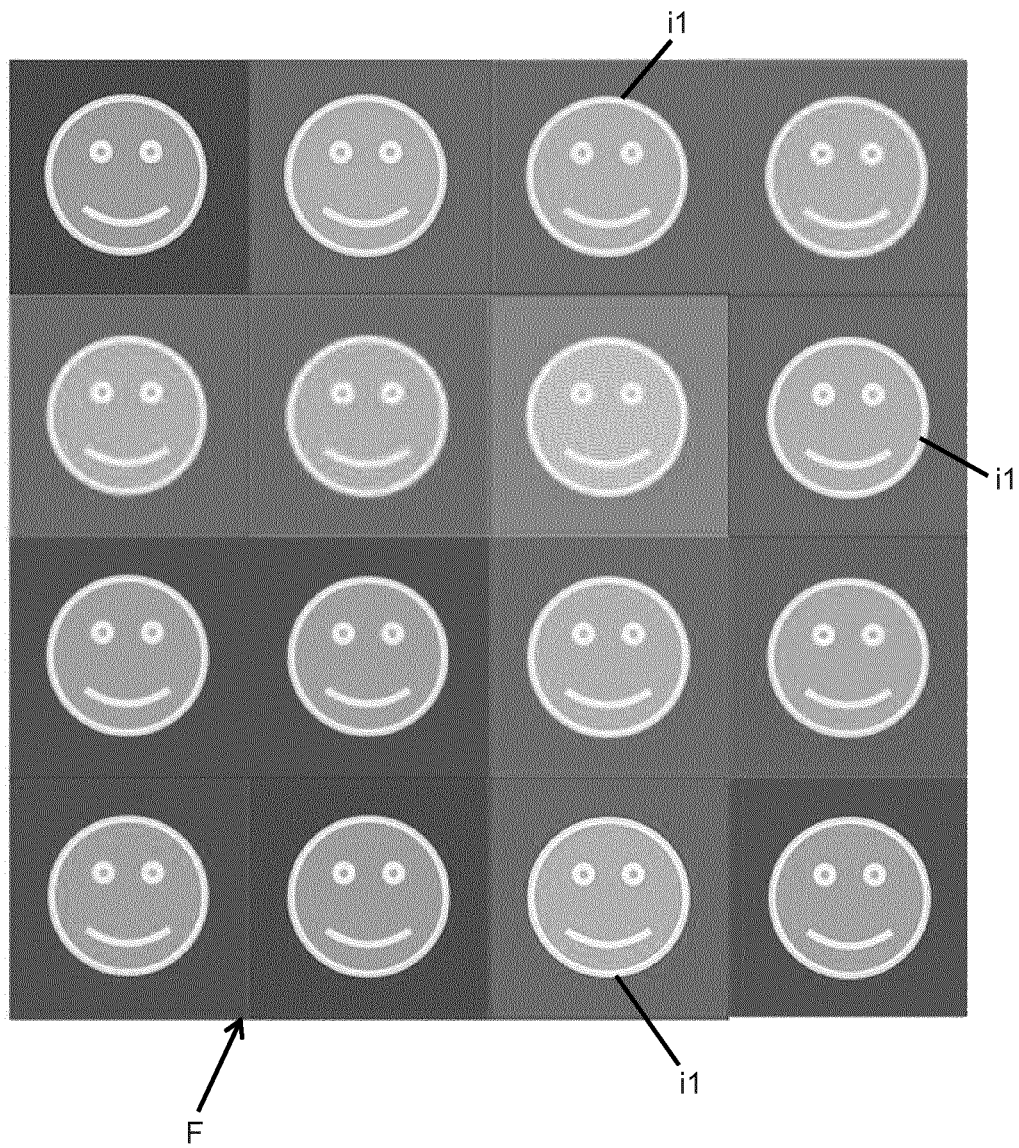

The filter F can be broadly designed according to the required need. FIG. 1 shows a filter in which each of the images i1 of the object 1 is filtered differently, for example, filtered at a different wavelength.

The filter F can be a spectral filter for example in the visible or infra-red spectrum, but alternatively a polarization filter or an intensity filter or any combination of these. The filter can thus be configured to simultaneously filter spectrally and in polarization.

An exemplary intensity filter is a neutral density filter but the present invention is not limited to such an intensity filter and generally concerns any intensity filter that modifies the light intensity which is for example modified identically or differently spatially across the filter, and/or modified identically or differently spectrally across the filter. An exemplary polarization filter is a waveplate or retarder but the present invention is not limited to such a polarization filter and generally concerns any polarization filter that modifies the light polarization direction which is for example modified identically or differently spatially across the filter, and/or modified identically or differently spectrally across the filter.

The filter can, for example, filter simultaneously the multiple images i1 at the same or at different wavelengths. Alternatively, the filter can be configured to filter a first plurality of the images i1 at a first wavelength and a second plurality of images i1 at a different wavelength. This is similarly true for polarization or intensity filtering. Image data or information can be captured in the spatial or the frequency (Fourier) domain.

As shown in FIG. 1, the filter F is located so that the multiple images i1 interact with the filter and are filtered by the filter F.

The system can further include the image sensor or detector S.

The system is preferably a hyper or multi-spectral optical system.

The optical filter F is positioned away from the image sensor plane SP and the image sensor S.

The image sensor S (see for example FIG. 5A) comprises a plurality of light sensing elements or pixels (or super-pixels) P extending in a vertical direction V and a plurality of light sensing elements or pixels P extending in a horizontal direction H, the horizontal direction H being perpendicular to the vertical direction V. The image sensor S can thus be a 2D detector array.

Alternatively, the image sensor S comprises a plurality of light sensing elements or pixels (or superpixels) P extending only in the vertical direction V or a plurality of light sensing elements or pixels P extending only in a horizontal direction H thus forming a 1D detector array.

The image sensor S is, for example, a CMOS device or a CCD device comprising a plurality of pixels each configured to individually capture incoming light or an active pixel sensor (APS) containing an array of pixel sensors each comprising for example a photodetector and an amplifier.

It is however not necessary that the optical system include the image sensor S. Alternatively, the image sensor S can be replaced by another device such as an additional optical element.

Figures 5A, 5B:
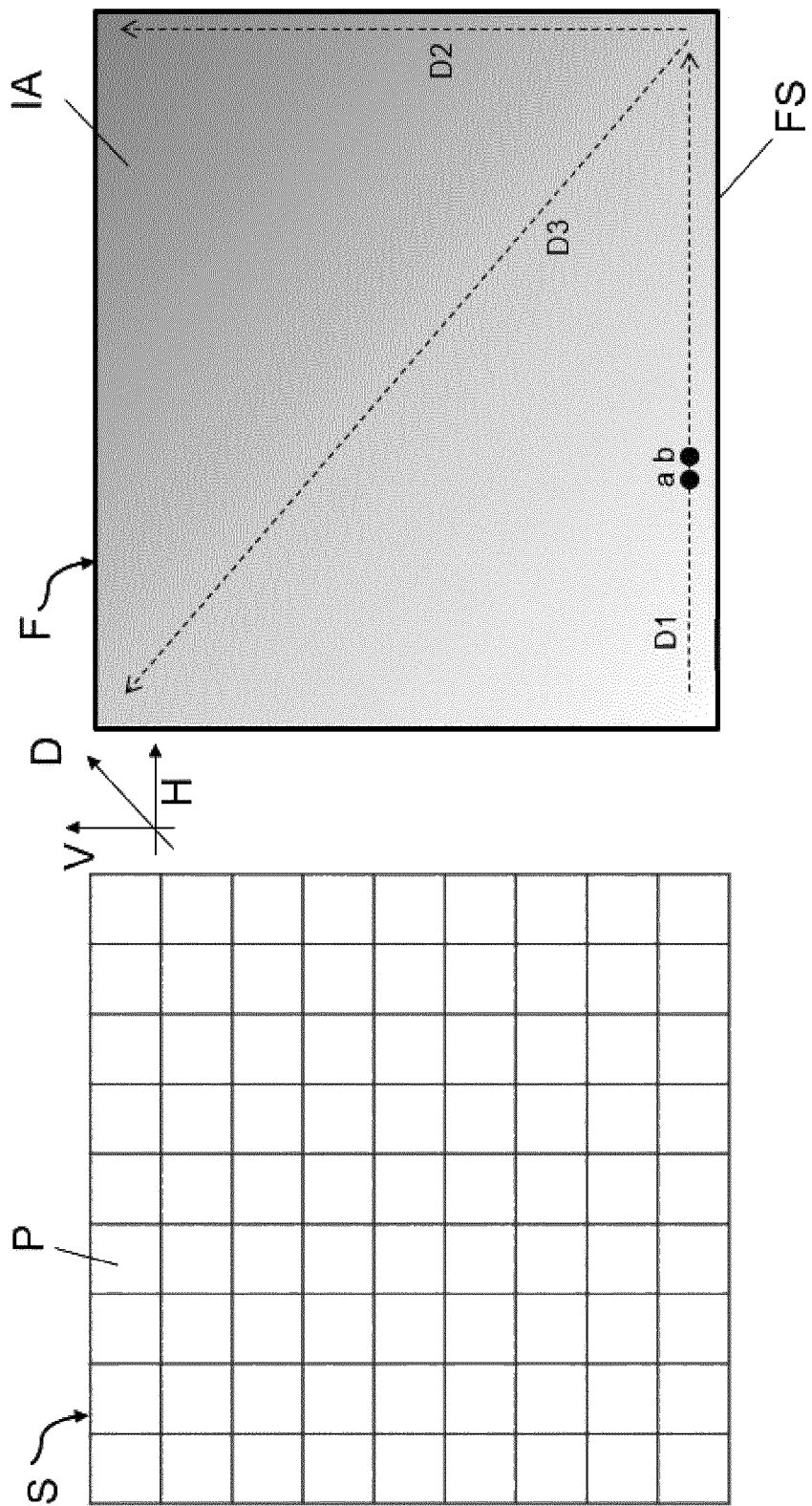
FIG. 5E illustrates an image sensor or array of imaging elements comprising a N×N array of elements, and the graded filter of FIG. 5D which is aligned with the horizontal axis H of the sensor or array of imaging elements.
FIG. 5F shows one example of an optical filter including a filtering section FS according to the present invention.

The image forming elements of the array 4 contains, for example, a plurality of lenses, micro-lens or pinholes. The array 4 of image forming elements preferably contains a plurality of image forming elements extending in the vertical direction V and a plurality of image forming elements extending in the horizontal direction H when the image sensor S is a 2D array. The array 4 may for example have a layout identical to that of the pixels (or super-pixels) P of the image sensor S as shown in FIG. 5A or 5C where P in such a case represent an imaging element such as a microlens or pin-hole.

Alternatively, the array 4 of image forming elements contains a plurality of image forming elements extending in the vertical direction V or a plurality of image forming elements extending in the horizontal direction H when the image sensor S is a 1D array.

Figure 2:
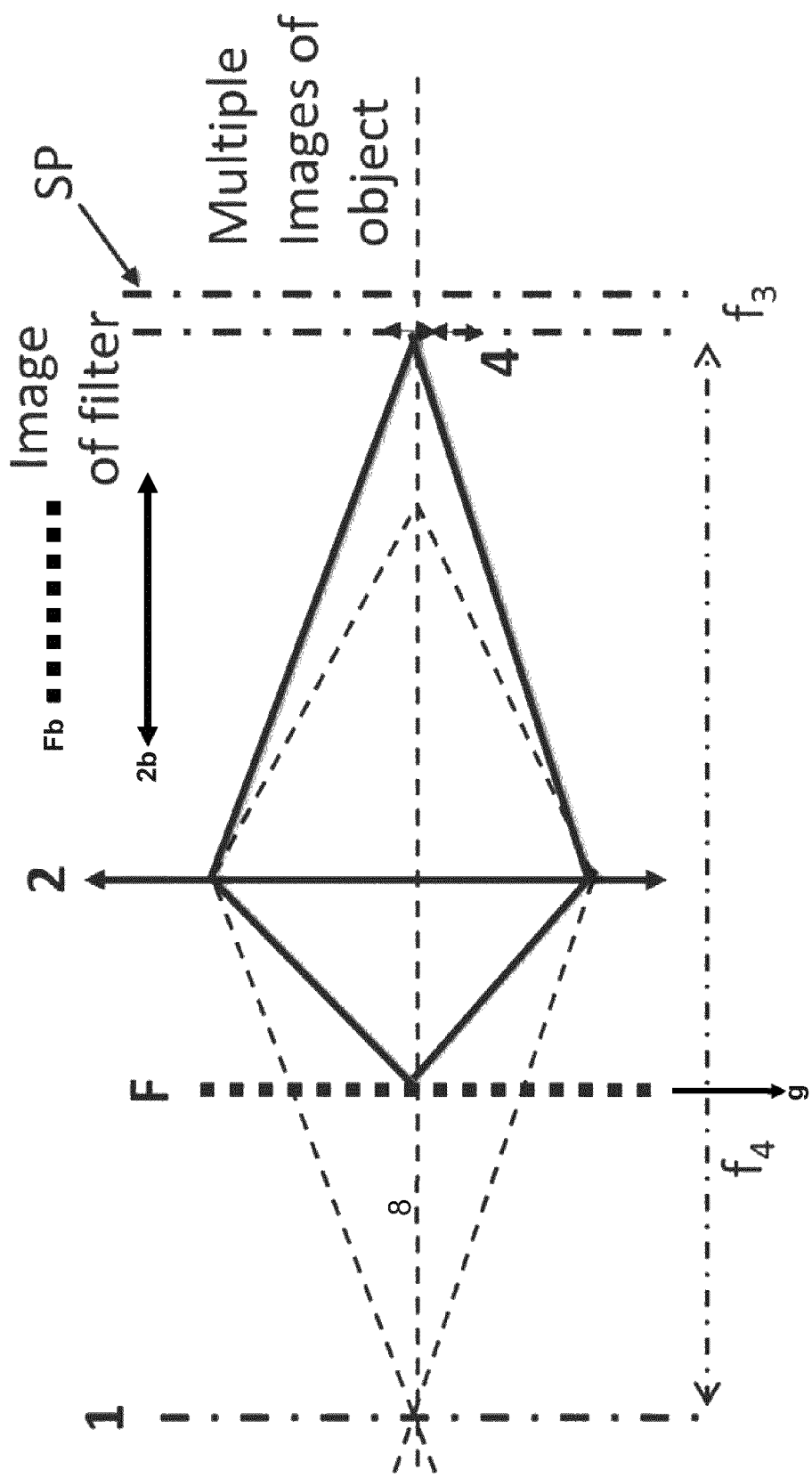

According to one exemplary embodiment as shown in FIG. 2, the objective lens 2, the optical filter F, the array 4 of image forming elements and the image sensor S are arranged along the optical axis 8 so that the array 4 forms multiple images i1 (FIG. 1) of the object 1 on the image sensor S (or at the sensor plane SP), and the objective lens 2, the optical filter F, the array 4 of image forming elements and the image sensor S are arranged along the optical axis 8 to form an image of the filter F on or across the image forming elements of array 4. The optical system is thus configured to form a real image of the filter on the array 4 of image forming elements to filter the multiple images i1 of the object 1.

The image sensor S is not shown for clarity reasons but is represented by the sensor plane SP.

The optical filter F can be (physically or materially) located at a position upstream (behind) from the objective lens 2 (as shown in FIG. 2 or can be in contact with the objective lens 2 so that the filter F is imaged by the objective 2 onto the array 4 of image forming elements (a real image of the filter is formed on the array 4). The object 1 is also located at a position upstream (behind) from the objective lens 2.

As shown in FIG. 2, the filter F is (physically) located in object space behind (upstream relative to the light incident direction) the lens 2. $f_4$ is the distance of the object 1 from the array 4 and 13 is the focal distance of the elements of the array 4.

Rays from the same position in object 1 space (equally dashed lines) form an image before the array 4 via lens 2 behind (upstream relative to the light incident direction) the array 4. Each element of the array 4 images the object 1 onto the sensor plane SP thus forming multiple images of the object at the sensor plane SP. The filter F is imaged by the same lens 2 onto the elements of the array 4 forming a real image of the filter on the array 4.

The multiple images i1 can thus be filtered at different wavelengths for example given that the filter F has been imaged onto the imaging forming elements.

This permits the configuration illustrated in FIG. 1 to be achieved.

In the exemplary illustration of FIG. 1, a total of 16 reproductions of image i1 of the object 1 produced by an array 4 containing at least 16 elements (microlens) are shown. The filter F filters 4×4 different wavelengths schematically represented by 16 tiles. The 16 reproductions of image i1 are repeated in a pixel-like manner so that each of the reproductions of the imaged object i1 is for example filtered at different filtering wavelengths. The filter F is represented schematically in FIG. 1 as tiles for ease of understanding and further details of filter F are provided below.

Alternatively, the optical system may further include a second objective lens 2b and a partially reflecting/transmitting mirror or element. The partially reflecting/transmitting mirror or element is located for example on the optical axis 8 between the objective lens 2 and the array 4 and allows light from the object 1 to be transmitted through to the array 4. The filter F is replaced by the filter Fb (that can be identical to filter F) for example in the position shown in FIG. 2. Filter Fb is imaged by the second objective lens 2b with the light been reflected by the partially reflecting/transmitting mirror or element so that a real image of the filter is formed on the array 4. The partially reflecting/transmitting mirror or element is for example orientated at a 45° angle to the optical axis 8.

The optical filter F could be placed along the optical axis 8 in front of (downstream), behind (upstream) or on the array 4 of image forming elements (not illustrated). In other words, the filter F is physically positioned in front of, behind or on the array 4 and not located behind lens 2 as shown in FIG. 2. This equally permits configuration of FIG. 1 to be achieved. It is preferable to position the optical filter F as close to the array 4 as possible but this is not necessary. As mentioned above, the filter F of the optical system can be a spectral filter, for example, in the visible or infra-red spectrum, a polarization filter or an intensity filter or any combination of these. The filter F can be tilted or rotated with respect to the optical axis 8.

In one embodiment, the filter can comprise a plurality of individual discrete filters arranged together in a mosaic or tiled manner in contact or optionally including a separation zone between each discrete filter.

In another embodiment, the optical filter F of the hyper or multi-spectral optical system of all embodiments of the present inventions includes a filtering section FS as illustrated for example in FIG. 5B. The optical filter F can comprise only one filtering section FS or may include filtering section FS as well as other filters different or identical to filtering section FS.

The optical filter F and filtering section FS define an incident surface area IA for receiving light to be filtered.

The filtering section FS is configured to continuously filter light incident across the incident surface area IA.

That is, filtering occurs at each position on the incident surface area IA. There is no interruption in filtering at any position on the incident surface area IA. The filtering section FS does not contain borders or interruptions that interrupts the light filtering that are present for example in mosaic-construction filters.

In other words, if the filtering section FS is for example configured to filter in the visible spectrum and a collimated beam of white light producing a small spot size on the filter section FS was displaced across the incident surface area IA, then the incident white light would always undergo filtering by the filter section FS as the spot is displaced across the incident surface area IA.

The filtering section FS is configured to continuously filter light that is incident on and across the incident surface area IA along a direction D1 of the incident surface area IA as shown in FIG. 5B.

The direction D1, for example, extends in or is parallel to the horizontal direction H in which the elements p of the image sensor S extend, as shown in FIG. 5A.

The filtering section FS is configured to filter at different wavelengths across the incident surface area IA along the direction D1 following the horizontal direction H.

That is, the filtering section FS is configured to continuously filter across the incident surface area IA along a horizontal direction (H), and configured to continuously filter at different wavelengths across the incident surface area IA along the horizontal direction H, the horizontal direction H being defined as above or alternatively defined as being the direction perpendicular to the optical axis 8 and to the earth's gravitational force direction g acting on the filter F.

The spectral filtering can be continuously varying in wavelength across the direction D1 of the filter section FS, or can vary only at one distinct portion along the direction D1 or can vary only at a plurality of different portions of the filter section along the direction D1 (or can be any combination of these). The change in spectral filtering wavelength can be gradual or abrupt. For example, the change in filtered wavelength between positions a and b in FIG. 5B can be a few nanometers or tens of nanometers or more.

The filtering section FS can be further configured to continuously filter light that is incident on and across the incident surface area IA along directions D2 and/or D3 of the incident surface area IA as shown in FIG. 5B. The direction D2 extends in or is parallel to the vertical direction V in which the elements p of the image sensor S extend, as shown in FIG. 5A The direction D3 extends in the diagonal direction at 45° to directions D1 and D2 as shown in FIG. 5B.

The filtering section FS is configured to filter at different wavelengths along the direction D2 following the vertical direction V and along the diagonal direction D3. Similarly, spectral filtering can be continuously varying in wavelength across the directions D2 and/or D3 of the filter section FS, or can vary only at one distinct portion along the directions D2 and/or D3 or can vary only at a plurality of different portions of the filter section along the directions D2 and/or D3 (or can be any combination of these). The change in spectral filtering wavelength can also be gradual or abrupt.

It is noted that the direction D1 is not limited to the specific direction D1 illustrated in FIG. 5B but is to be understood as any direction parallel to the illustrated direction D1 along the filter section FS. This is equally true for directions D2 and D3.

In another embodiment, the filtering section FS can be configured to continuously filter light, that is incident on and across the incident surface area IA, along all directions of the incident surface area IA. The filtering section FS is configured to filter at different wavelengths along all directions across the incident surface area. Spectral filtering can be continuously varying in wavelength across all directions of the filter section FS, or can vary only at one distinct portion along one direction or can vary only at a plurality of different portions of the filter section along a plurality of directions (or can be any combination of these). The change in spectral filtering wavelength can also be gradual or abrupt.

FIG. 6 shows an exemplary optical system including a filter F containing such a filtering section FS.

While described in relation to spectral filtering, the above equally applies to polarization and intensity filtering and the previously mentioned polarization and intensity filters.

Figure 5E:
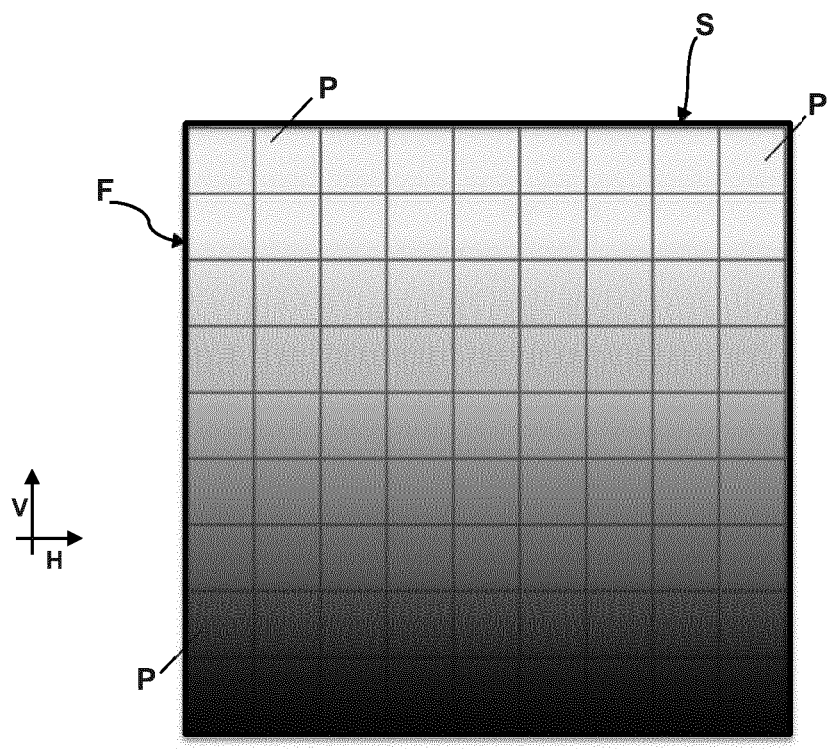
Figure 5F:
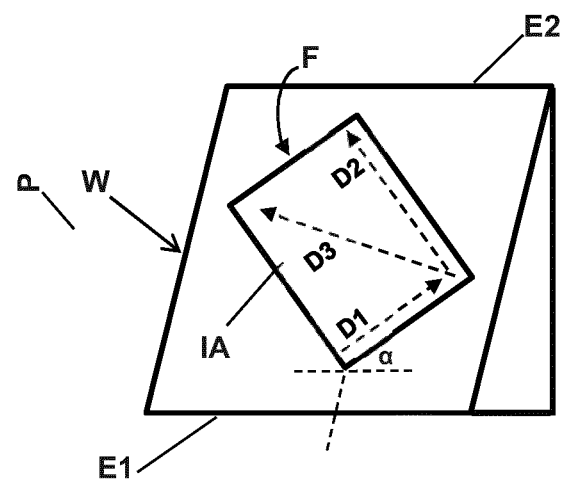

FIG. 5F shows on example of how to provide a filtering section FS configured to continuously filter light along all directions of the incident surface area IA and that is configured to filter at different wavelengths along all directions across the incident surface area IA where spectral filtering is continuously varying in wavelength across all directions of the filter section FS. The filtering section FS is cut out of a wedge filter W comprising optical material whose thickness linearly increases for example from a first end E1 to a second end E2. The filtering section FS is completely cut out of the wedge filter W along the illustrated perimeter of the filtering section FS which is orientated at angle α to the slope of the wedge filter. The physical and optical thickness of this filtering section FS continuously varies in each of the directions D1, D2 and D3 and indeed in all directions which allows spectral filtering continuously varying in wavelength. The optical material of the wedge filter W is continuous across the incident surface area IA thus permitting continuously filtering of the light across the filtering section FS.

The filtering section FS can for example comprise one layer of optical material or a plurality of superposed optical layers. The layer (or layers) is a continuous layer defining the incident surface area IA.

The optical thickness of the filtering section can vary across the entire filtering section FS along any one or all of the directions D1, D2, D3 or along all directions. Alternatively, the optical thickness of the filtering section can vary across only a portion or a plurality of different portions of the filtering section along any one or all of the directions D1, D2, D3 or along all directions. The optical thickness of the filtering section FS can vary across the filter continuously in a linear or non-linear manner, and/or vary according to a step-profile. This permits a large range of spectral filters to be constructed in which different wavelengths or the same wavelengths can be filtered at different spatial position along or across the filter.

The manufacturing of such a filter is advantageously less complex and cheaper and permits a hyper or multi-spectral optical system that is less complex and less expensive to be produced while still allowing filtering at multiple wavelengths and allowing the range of angles impinging on the filter to be small permitting accurate filtering. Another embodiment relates to a linear graded filter as schematically shown for example in FIG. 5D. The manufacturing of such a filter is advantageously less complex and cheaper.

Such filters are, for example, particularly advantageous compared to filters produced by lithography manufacturing processes where relatively small individual filters are attached to each pixel of a multi-pixel array.

In such a linear filter, the filtered wavelength varies continuously with position in the vertical direction V. The wavelength filtered by the linear graded filter is constant along one axis, that is, along direction H. This is schematically shown in FIG. 5D by a line BB. The same wavelength is filtered in a direction across line BB. A different wavelength is filtered as one moves down the filter from i to ix. A line BB at each of the different positions i to ix filters the same wavelength in a direction across that line. In this example, only 9 different wavelengths i to ix can be filtered.

The number of usable wavelengths when this filter is used in a hyperspectral/mulitspectral system is generally limited.

FIG. 5E shows an exemplary 9×9 array (N×N array where N=9) of parallel images i1 or 9×9 pixels or super-pixels P on the image sensor S. The linear graded filter F will reduce the potential number of filtered wavelengths to just 9, or in the generic case it reduces the range of the potential number of filtered wavelengths from $N^2$ to N as is the case where one has individual filters per pixel or when the filter is aligned and not orientated at an angle to the array 4 or sensor S. This is clearly illustrated in FIG. 5E, where the filter F is aligned on top of the detector S. From FIG. 5E, it can be understood that only 9 different wavelengths are filtered.

The multispectral or hyperspectral system may include however such a filter F tilted around the optical axis 8 of the optical system to change the alignment between the filter F and either the matrix of pixels P of the image sensor S or the array 4 of imaging elements as illustrated for example in FIG. 7.

When the filter F is tilted at an angle of 45 degrees as represented in FIG. 8, then all diagonal rows of the image sensor S will see a different filtering wavelength. In this case, assuming the image sensor is a square matrix N×N, the number of different filtered wavelengths becomes 2N−1. For the 9×9 array, a total of 17 different wavelength filters is possible, assuming the array 4 and the sensor are aligned. It is preferable that the filter F of FIG. 8 has a surface area A that covers all diagonal rows of the image sensor S.

If the filter is tilted at an angle $\tan^{-1}(1/C)$, then all $C^2$ possible wavelength filters can be used where C is the number of images i1 (or imagelets generated by the imaging elements of array 4 i.e. 16 in FIG. 1) in an optical system arranged to produce configuration of FIG. 1. Here, it is preferable that filter F has a surface area A that covers substantially the surface area of the image sensor S when imaged. This means that if the filter F is square and tilted the total size will be larger than the detector.

The extension to a rectangular N×M (where N≠M) configuration or a hexagonal configuration is identical. Indeed, the improvement in filtering is independent of the specific design of the array 4 and the layout of the array elements, which can be hexagonal, circular, square etc. The angle $\tan^{-1}(1/C)$ is the angle that gives maximum number of distinct central wavelengths for a linear graded filter.

It is to be noted that by wavelength it is meant central wavelength as the filtered wavelength may have a linewidth and thus other wavelengths around a central wavelength may be filtered but to a reduced extent to that of the central wavelength.

As illustrated in the exemplary optical system of FIG. 7, the filtering section FS and filter F is orientated at an angle φ about the optical axis 8 and orientated with respect to the image sensor S. The axis DC of constant optical thickness of the filtering section FS, which define a constant filtering direction on the filter, is orientated at an angle φ relative to the horizontal direction H or the horizontal axis of the image sensor S in which a plurality of light sensing elements or pixels/super-pixels P extend in the horizontal direction H or alternatively at an angle φ to the direction H perpendicular to the optical axis 8 and to the earth's gravitational force direction g acting on the filter F.

The angle φ can be varied to determine and maximize the number of filtered wavelengths as explained previously.

While FIG. 7 shows one particular optical setup, it is to be understood that this tilted filter can be used in any hyper or multi-spectral optical systems disclosed herein.

More generally, the array 4 comprises a plurality of elements such as lenses, microlens or pinholes. A location of an element or each element on the array 4 is defined by a first basis vector $\alpha_1$ and a second basis vector $\alpha_2$. The basis vectors extend in the 2D plane defined by the array 4.

The basis vector magnitude defines, for example, a distance between two elements, for instance, the distance from the geometrical center of one aperture element to the geometrical center of a neighboring aperture element, for example, the nearest neighbor aperture element. The basis vector magnitude may define, for example, the width or diameter of an aperture element in the plane of the array 4.

The first basis vector $\alpha_1$ extends for example in a first direction aligning a plurality of aperture elements and the second basis vector $\alpha_2$ extends in a second different direction also aligning a plurality of aperture elements. For example, the basis vector direction aligns the geometrical center of the plurality of aperture elements.

The first basis vector $\alpha_1$ and the second basis vector $\alpha_2$ are set to be orthogonal in the case where the first aperture array 4 defines a square or rectangular matrix of aperture elements.

In a hexagonal array 4, the basis vectors define an angle of (substantially) 60 degrees and 90 degrees for a square or rectangular matrix of elements.

The constant filtering direction of the projection of the optical filter F on the array 4 is orientated about the optical axis (or along a direction parallel to the optical axis) at an angle φ relative to the first basis vector $\alpha_1$ direction (or an axis defined by the first basis vector $\alpha_1$ direction) and is orientated relative to the second basis vector $\alpha_2$ direction (or an axis defined by the second basis vector $\alpha_2$ direction).

While described in relation to spectral filtering, the above equally applies to polarization and intensity filtering and the previously mentioned polarization and intensity filters that include at least one filtering direction along which the same or constant intensity or polarization is filtered. This constant filtering may occur entirely across the filter or across only a portion of the filter.

The filter section FS can be for example either linearly graded in the form for example of a Fabry-Perot Wedge W (such as shown in FIG. 5F) or can be also be a matrix or assembly of discrete filters. For example, the optical thickness of the filtering section FS can vary across the filter according to a step-profile to produce such an assembly of discrete filters.

An exemplary linear graded filter is the Linear Variable Bandpass Filter for Hyperspectral Imaging (LF103252) from Delta Optical Thin Film. This has for example a 25 mm×25 mm area size, with wavelength filtering in the range of 450 nm to 850 nm. The spectral width of a typical filtering peak of FWHM of 4% of the linewidth and with an out of band rejection being <0.01%. The filtering section FS can, as previously mentioned, be linearly or non-linearly graded.

The filter F can be for example formed from thin film coatings on glass substrates that can be patterned during deposition (in situ), or by using a photolithographic process over the coating to block the addition or subtraction of materials deposited on the substrate surface, e.g. Materion.

FIGS. 3 to 4 show another exemplary optical system.

The optical system, for example a hyper or multi-spectral, includes the objective lens 2, a field stop 9, image lens 3, the array 4 of image forming elements and the image sensor S.

As previously mentioned, it is however not necessary that the optical system include the image sensor S. Alternatively, the image sensor S can be replaced by another device such as an additional optical element.

The optical system is also configured to form a real image of the filter F on the array 4 of image forming elements to filter the multiple images i1 of the object 1.

The field stop 9 is positioned between the objective lens 2 and the imaging lens 3, and the array 4 of image forming elements is positioned between the imaging lens 3 and the image sensor S.

All elements are arranged along the optical axis 8. The image sensor S is not shown for clarity reasons but is represented by the sensor plane SP.

The lens 2 has a focal distance $f_1$, the lens 3 has a focal distance $f_2$ while the imaging forming elements of array 4 have a focal distance $f_3$. $d_1$ is the object distance from objective lens 2 and $d_2$ is the image distance where $$d_2 = 1 + f_2 - \frac{f_2}{f_1} d_1$$

and $d_1$ can range from 0 to $2f_1$ while $d_2$ ranges from $2f_2$ to 0.

The optical filter F can be (physically or materially) located at a position upstream (behind) from the objective lens 2 (as shown in FIGS. 3 and 4) or can be in contact with the objective lens 2 so that the filter F is imaged by the objective 2 and image lens 3 onto the array 4 of image forming elements (a real image of the filter is formed on the array 4). The object 1 (not shown) is also located at a position upstream (behind) from the objective lens 2.

The array 4 images an object 1 at a position upstream (behind) from the objective lens 2 onto the image sensor S (sensor plane SP) to provide a plurality of images i1 (FIG. 1) of the object 1 at the image sensor S (sensor plane SP). The object 1 is not shown in FIGS. 3 and 4 for clarity reasons.

The array 4 of image forming elements is shown in the exemplary systems of FIGS. 3 and 4 located at the distance $d_2$ from the imaging lens 3 and at a distance $f_3$ from the sensor plane SP (sensor 5). However, it is noted that this is not necessary for the system to function and the array 4 of image forming elements can be located about the distance $d_2$ from the imaging lens 3 and about the distance $f_3$ from the sensor plane SP (sensor S).

Alternatively, the optical system of FIGS. 3 and 4 can similarly further include the second objective lens 2b and the partially reflecting/transmitting mirror or element filter mentioned previously with respect to the embodiment of FIG. 2 to form an image of filter Fb on the array 4.

The optical system is preferably telecentric. The optical system can be configured to limit the light rays forming the filter image on the array 4 to telecentric light rays or to lights rays propagating (substantially) parallel to an optical axis of optical system. This advantageously permits a fixed magnification image of the filter to be formed on the array 4.

The optical system is configured to be telecentric with respect to the filter F and/or to be telecentric with respect to the image of the filter F.

The optical system is configured to be image-space telecentric and more particularly telecentric in the image plane of the filter F. The optical system is configured so that chief light rays are (substantially) parallel to the optical axis 8 in the filter's image space, for example, on the filter's image side of the lens 3 in FIG. 3.

The optical system can be configured so that an exit pupil of the filter imaging lens is at infinity in front of the lens.

This can be accomplished, for example, by setting an aperture stop at the back focal plane of the lens 3.

The optical system can additionally be configured to be telecentric with respect to the filter F in object space. The optical system is configured to be object space telecentric in particular telecentric in the object plane of the filter to form a doubly telecentric system.

The optical system is configured so that chief light rays are (substantially) parallel to the optical axis 8 in the filter's object space, for example, on the filter's object side of lens 2 in FIG. 3.

The optical system can be configured so that an entrance pupil of the filter object lens is at infinity behind the lens.

This can be accomplished, for example, by setting an aperture stop at the front focal plane of the lens 2.

This can be achieved for example via the field stop 9. The field stop 9 is located (substantially) at or about the focal point $f_1$ of the objective lens 2 to control a distribution of light rays over a surface of the array 4 of image forming elements to control the perspective of the imaged object 1 allowing telecentric operation. The stop 9 is also located behind the second lens 3 substantially at or about the focal point $f_2$ of the second lens 3 to create a doubly telecentric system (meaning the system is telecentric in both the object space and telecentric in the image space) limiting light rays from the object 1. This allows a doubly telecentric system to be created.

It is, however, not necessary that the system include the field stop 9. A system telecentric only in image space of the filter F or doubly telecentric can be produced in other manners well known to a skilled person in the art.

This system of FIGS. 3 and 4 produces multiple images i1 of the object 1 as schematically shown in FIG. 1. The array 4 is used to form multiple parallel images i1.

The filter F and filtering section FS is imaged onto the microlens array 4 as schematically shown in FIGS. 3 and 4. The filter F or a real image of the filter F is placed in the object space upstream from the lens 2, and the filter F or the real image of the filter F is imaged using lens 2 and lens 3 onto the array 4 as shown in the example of FIGS. 3 and 4.

FIG. 3 schematically shows an exemplary configuration. The filter F is placed at the telecentric object position with respect to the lens 2 and lens 3. Rays from the same position at the filter F, e.g. solid lines, fill completely the field stop 9 and are imaged onto the array 4. Each element of the array 4 samples a certain part of the filter F. The same part of filter F is preferably never seen by more than one element of the array 4. FIG. 4 also shows the filter F placed at the telecentric object position with respect to lens 2 and lens 3. Rays from an object with the same angle in object space (e.g. bold line of FIG. 4) pass through the same point of the field stop 9 and each come to a focus with the same relative position behind array 4 and at the sensor plane SP creating a series of identical imagelets i1 of the object 1.

The optical system of FIGS. 3 and 4 is configured as a telescope system so that identical imagelets i1 of the object 1 are formed behind array 4. This telescope system permits to remove parallax in image/object space.

The system of FIGS. 3 and 4 can alternatively be made telecentric by not including the field stop 9 and instead including telecentric lenses for the object lens 2 or the image lens 3 or made doubly telecentric by including telecentric lenses for the object lens 2 and the image lens 3. Although an object 1 or image sensor S that is too close or too far from the lens may still be out-of-focus, the size of the resulting blurry images i1 will remain (substantially) unchanged. FIG. 9 shows modelling in Zemax™ using a pair of achromatic lenses for the object lens 2 and the image lens 3. The doubly telecentric optical system forms a fixed magnification image of filter on (microlens) array 4. In the optical system of FIG. 2, lens 2 can be a telecentric lens.

The optical system is telecentric with respect to the filter F and the image of the filter. The system is then afocal and if the angular magnification is unity, then functions as a plug and play module which can be dropped in or inserted into another optical system or apparatus to seamlessly operate therein.

The afocal optical system can be dropped into or inserted into a single telecentric optical system or apparatus or a doubly telecentric optical system to make it a four-times telecentric system.

The optical system is telecentric with respect to the filter F and the image of the filter and can be telecentric with regard to the object and image of a scene that is to be viewed, The optical filter F could be physically located downstream (in front of) from the array 4 between the array 4 and the sensor S, or upstream (behind) from the array 4 between the array 4 and the lens 3. In this case, the optical filter F is not physically located at a position upstream (behind) from the objective lens 2 or in contact with the objective lens 2. The optical filter F can alternatively be located on the array 4 of image forming elements.

The array 4 of image forming elements and/or the objective lens 2 in any of the above described embodiments can be mounted in the system, for example on a translational mount or stage, to be mobile along the optical axis 8 to allow the spatial resolution of the optical system to be increased.

As shown schematically in FIGS. 10 to 12, the optical system of FIGS. 3 to 4 may include a beam-splitter BS to, for example, increase spatial resolution. Depending on the position of the beam-splitter BS in the system a third lens 3b and a second sensor Sb may be required as shown in FIGS. 10 to 12.

In FIG. 10, the beam-splitter BS is located between the objective lens 2 and the image lens 3 and a third lens 3b is arranged to image filtered light onto a second image sensor Sb through an aperture 9b.

In FIG. 11, the beam-splitter BS is located between the objective lens 2 and the array 4 of image forming elements and a third lens 3b (not illustrated) may be arranged to image filtered light onto a second image sensor Sb but advantageously is not necessary. As the beam-splitter is after the lens 3 the signal is filtered. This gives a summed transmission of the filter and useful information. Advantageously, no additional optical elements except the beam-splitter is required.

In FIG. 12, the beam-splitter BS is located between the filter F and the image lens 3 and a third lens 3b is arranged to image filtered light onto a second image sensor Sb. The beam-splitter BS is after the filter and thus the signal is filtered. This gives a summed transmission of the filter and useful information.

Alternatively, the system may further include a beam-splitter BS, a third lens 3b and a second image sensor Sb, where the beam-splitter BS is located before the filter F, and the third lens is arranged to image unfiltered light onto the second image sensor 3b.

The inclusion of a beam-splitter in the optical system advantageously provides image enhancement and permits a higher spatial resolution to be obtained. A tradeoff exists between spatial and spectral resolution but the inclusion of a beam-splitter for a given spatial resolution can allow one to have a larger number of spectral channels compared to the case without a beam-splitter.

Although only shown with respect to the optical system of FIGS. 3 to 4, the beam-splitter BS and associated elements can also be used in the optical system of FIG. 2 in a manner similar to that illustrated in FIGS. 3 to 4.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

The invention claimed is:

1. An optical system including:
   at least one objective lens for receiving light from an object; and
   a filter,
   wherein the optical system further includes an array of image forming elements configured to generate multiple integral and replicated images of the object on an image sensor plane, and wherein the optical system is configured to form a real image of the filter on the array of image forming elements to filter each of the multiple integral and replicated images of the object, the filter being arranged with respect to the at least one objective lens so that a real image of the filter is formed on the array of image forming elements, and wherein the optical system is configured to be telecentric in the image plane of the filter.

2. The optical system according to claim 1, wherein the optical system is further configured to be telecentric in the object plane of the filter to form a doubly telecentric system.

3. The optical system according to claim 1, wherein the filter is located at a position upstream from the objective lens or behind the objective lens or in contact with objective lens so that the filter is imaged by the objective onto the array of image forming elements.

4. The optical system according to claim 1, wherein the filter is a multiplexed filter.

5. The optical system according to claim 1, wherein the optical system is configured to limit the light rays forming the filter image on the array to telecentric light rays or to lights rays propagating substantially parallel to an optical axis of optical system.

6. The optical system according to claim 1, wherein the filter is mounted in the optical system to be rotatable and/or tiltable about an optical axis of the optical system.

7. The optical system according to claim 1, wherein the filter is a spectral filter, a polarization filter or an intensity filter, or a spectral and polarization filter, or a spectral and intensity filter, or a polarization and intensity filter, or a spectral, polarization filter and intensity filter.

8. The optical system according to claim 1, wherein the image forming elements of the array of image forming elements comprise lenses, micro-lenses or pinholes.

9. The optical system according to claim 1, wherein the array of image forming elements comprises a plurality of image forming elements extending in a vertical direction and a plurality of image forming elements extending in a horizontal direction, the horizontal direction being perpendicular to the vertical direction; and
   wherein the filter defines an incident surface area for receiving light to be filtered, the filter being configured to continuously filter at different wavelengths across the incident surface area along a direction of the incident surface area following said horizontal direction.

10. The optical system according to claim 9, wherein the filter is further configured to continuously filter at different wavelengths along all directions across the incident surface area.

11. The optical system according to claim 1, wherein the filter is further configured to continuously filter at different wavelengths along a direction of the incident surface area following said vertical direction.

12. The optical system according to claim 1, wherein the optical system comprises the objective lens, a second lens, the filter and the array of image forming elements respectively arranged along an optical axis, wherein the filter is located at a position upstream from the objective lens or in contact with objective lens so that the filter is imaged by the objective and second lens onto the array of image forming elements, and the array generates the multiple images of an object on the image sensor plane.

13. The optical system according to claim 1, further including a field stop located between the objective lens and the second lens.

14. The optical system according to claim 13 wherein the objective lens and the second lens are located with respect to each other such that a focal point of the objective lens is located at a focal point of the second lens.

15. The optical system according to claim 13, wherein the optical system is a telescopic system.

16. The optical system according to claim 13, further including a beam-splitter, a third lens and a second sensor, wherein the beam-splitter is located between the objective lens and the second lens, and the third lens is arranged to image unfiltered light onto the second image sensor.

17. The optical system according to claim 1, wherein the array of image forming elements and/or the objective lens are mounted in the optical system to be mobile along the optical axis to allow the spatial resolution of the optical system to be increased.

18. The optical system according to claim 1, wherein the optical system is a hyper or multi-spectral optical system.

19. The optical system according to claim 1, wherein the filter is configured to simultaneously filter each of the multiple images of the object at a different wavelength.

20. Single or doubly telecentric optical system or apparatus including the optical system according to claim 1.

21. The optical system according to claim 1, wherein the optical system is configured to form a single real image of the filter on the array of image forming elements to filter each of the multiple integral and replicated images of the object.

* * * * *